United States Patent [19]
Shimokoriyama et al.

[11] Patent Number: 5,699,469
[45] Date of Patent: Dec. 16, 1997

[54] IMAGE SENSING RECORDING APPARATUS FOR DIGITAL RECORDING OF DIGITALLY MODULATED VIDEO SIGNALS WITHOUT FREQUENCY RATE CONVERSION

[75] Inventors: Makoto Shimokoriyama, Kawasaki; Teruo Hieda, Yokohama, both of Japan

[73] Assignee: Canon Kabushiki Kaisha, Tokyo, Japan

[21] Appl. No.: 356,864

[22] Filed: Dec. 15, 1994

[30] Foreign Application Priority Data

Dec. 28, 1993 [JP] Japan .................. 5-351456

[51] Int. Cl.[6] .................. H04N 9/79; H04N 9/80
[52] U.S. Cl. .................................. 386/1; 386/34
[58] Field of Search .................. 358/310, 330, 358/909.1, 906, 335, 320; 386/1, 12, 20, 31, 32, 34; 360/33.1; H04N 9/79, 9/80

[56] References Cited

U.S. PATENT DOCUMENTS

| | | | |
|---|---|---|---|
| 5,134,487 | 7/1992 | Taguchi et al. | 358/310 |
| 5,200,833 | 4/1993 | Suzuki et al. | 358/310 |
| 5,479,299 | 12/1995 | Matsumi et al. | 358/335 |

*Primary Examiner*—Thai Tran
*Assistant Examiner*—Huy Nguyen
*Attorney, Agent, or Firm*—Morgan & Finegan LLP

[57] ABSTRACT

An image sensing recording apparatus has a digital modulator for modulating a digital video signal (color-difference signal), a digital recording unit for digitally recording the digital video signal, and a clock supply unit for supplying a first clock signal on the basis of which modulation is performed by the digital modulator and a second clock signal on the basis of which recording is performed by the digital recording unit. The first and second clock signals have the same frequency.

18 Claims, 2 Drawing Sheets

IMAGE SENSING RECORDING APPARATUS FOR DIGITAL RECORDING OF DIGITALLY MODULATED VIDEO SIGNALS WITHOUT FREQUENCY RATE CONVERSION

BACKGROUND OF THE INVENTION

1. Field of the Invention

This invention relates to an image sensing recording apparatus and method. More particularly, the invention relates to an image sensing recording apparatus and method for executing digital signal processing.

2. Description of the Related Art

An image sensing recording apparatus known in the prior art obtains a video signal by processing an output signal from an image sensing element such as a CCD, records the video signal on a recording medium such as a video tape and reproduces the recorded video signal. In recent years, image sensing recording apparatus of this type have come to employ high-speed A/D and D/A converters.

In such apparatus, an analog video signal obtained from an image sensing element is converted to a digital signal by the A/D converter, and the digital signal is digitally modulated and recorded on video tape or the like. At playback, the signal is digitally demodulated when it is read from the video tape, the digitally reproduced video signal is converted to an analog signal and the analog signal is outputted.

In an image sensing recording apparatus which uses digital signal processing of this kind, the video signal processing circuit for processing the video signal from the image sensing element is composed of an analog circuit, and the analog video signal outputted by this analog video signal processing circuit is converted to a digital signal. The circuitry is large in scale owing to a large number of parts, and a large amount of power is consumed. Consequently, the apparatus is large in size and high in cost.

Further, since an analog signal processing circuit and a digital signal processing circuit are mixed, a satisfactory S/N ratio is not obtained because of interference in which the digital signal mixes in with the analog signal.

Furthermore, since the video signal processing circuit is constituted by an analog circuit, picture quality is governed by the capabilities of the analog circuit, such as its frequency characteristic, noise characteristic, temperature characteristic and a variance in characteristics from one element to the next. It is difficult to obtain high picture quality.

In an effort to solve these problems, an image sensing apparatus in which the video signal processing circuit is composed of an digital signal processing circuit also has been realized. With an image sensing recording apparatus of this kind, however, a color modulator for modulating color-difference signals R-Y, B-Y outputted by the digital video signal processing circuit performs modulation at a frequency (14.3 MHz) that is four times that of the normal color subcarrier. Consequently, when the color-difference signals R-Y, B-Y are recorded by a digital recorder, it is necessary to make a rate conversion to a clock frequency of 13.5 MHz used to drive an ordinary digital recorder. Owing to the rate conversion, beat troubles are produced and a decline in picture quality is the result.

SUMMARY OF THE INVENTION

An object of the present invention is to provide an image sensing recording apparatus and method capable of digitally recording a digitally modulated video signal without performing a frequency rate conversion.

According to the aspect of the present invention, the foregoing object is attained by providing an image sensing recording apparatus having digital modulating means for modulating a digital video signal, and digital recording means for digitally recording the digital video signal, the apparatus further including clock supply means for supplying a first clock signal on the basis of which modulation is performed by the digital modulating means and a second clock signal on the basis of which recording is performed by the digital recording means, the first and second clock signals being identical in frequency.

Further, according to another aspect of the present invention, the foregoing object is attained by providing an image sensing recording method having a digital modulating step of modulating a digital video signal, and a digital recording step of digitally recording the digital video signal, the method further including a clock supply step of supplying a first clock signal on the basis of which modulation is performed at the digital modulating step and a second clock signal on the basis of which recording is performed at the digital recording step, the first and second clock signals being identical in frequency.

Other features and advantages of the present invention will be apparent from the following description taken in conjunction with the accompanying drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENT

A preferred embodiment of the present invention will now be described in detail in accordance with the accompanying drawings.

Figure 1:
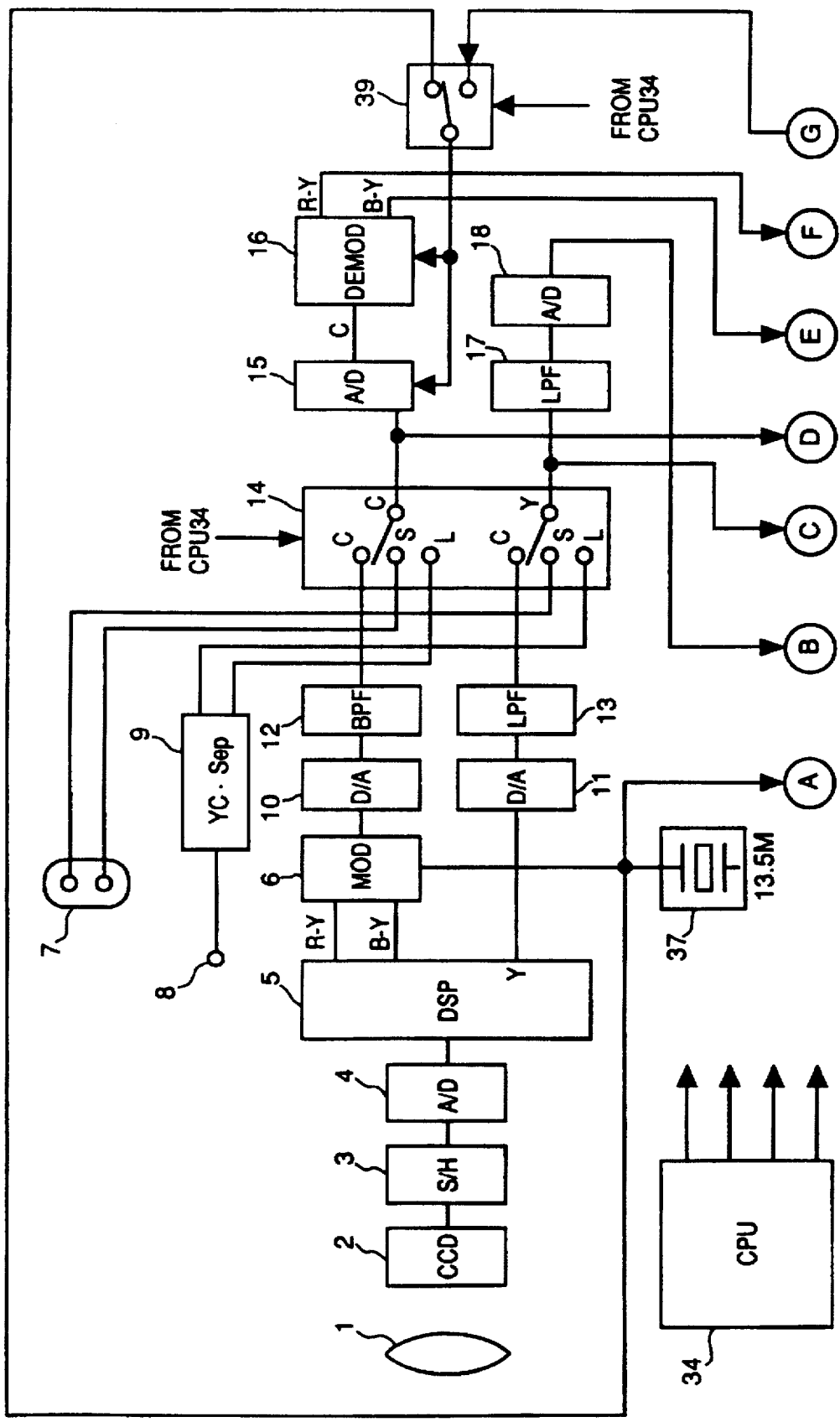
FIGS. 1 and 2 are block diagrams illustrating the general construction of an image sensing recording apparatus according to an embodiment of the present invention.
Figure 2:
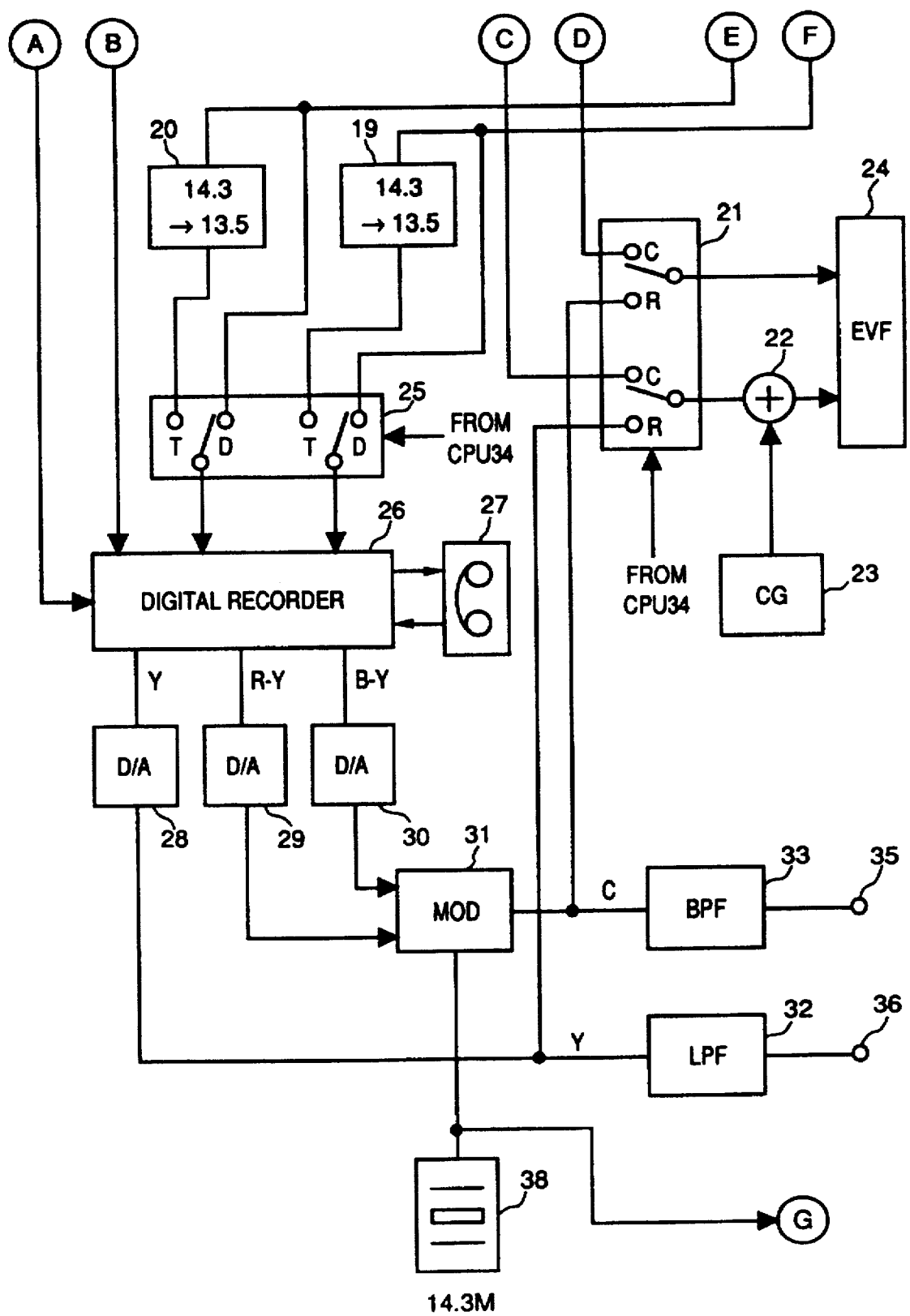

FIGS. 1 and 2 are block diagrams illustrating the general construction of an image sensing recording apparatus according to an embodiment of the present invention.

As shown in FIGS. 1 and 2, the apparatus includes an image pick-up lens unit which includes a lens, a diaphragm and an optical filter, a CCD 2 serving as color image sensing element, a sample-and-hold circuit 3 for sampling and holding an analog output signal from the CCD 2, and A/D converters 4, 15, 18 for converting analog signals to digital signals.

The A/D converter 5 is connected to a DSP (a digital video signal processing circuit such as a camera signal processing circuit) 5. The DSP 5 subjects a digital video signal input from the A/D converter 4 to such digital signal processing as filtering, color separation, gamma gain adjustment and clipping.

Digital and analog color converters 6, 31, respectively, modulate color-difference signals R-Y, B-Y and convert them to a color signal C.

The apparatus has an input terminal 7 to which a video signal from outside the device is applied in a form separated into a luminance signal Y and a color signal C, and an input terminal 8 to which a composite video signal, which is obtained by combining the externally applied luminance signal Y and color signal C, is applied. The input terminal 8 is connected to a YC separator 9, which separates the composite video signal from the input terminal 8 into the luminance signal Y and color signal C.

The apparatus includes D/A converters 10, 11, 28, 29 and 30 for converting digital signals to analog signals, BPFs (band-pass filters) 12, 33 and LPFs (low-pass filters) 13, 17, 32.

A selector 14 selects a video signal applied thereto from the input terminal 7 of the Y-C-separated video signals, the input terminal 8 for the composite video signal or the image sensing system inclusive of the CCD 2, outputs the color signal C of the selected video signal to the A/D converter 15 and a selector 21, and outputs the luminance signal Y to the low-pass filter 17 and the selector 21. A digital color demodulator 16 demodulates the color signal C, which has been modulated by the digital color modulator 6, to color-difference signals R-Y and B-Y.

Rate converters 19, 20 perform a frequency rate conversion to convert a frequency (14.3 MHz), which is four times the normal color carrier frequency, to a frequency of 13.5 MHz. The selector 21 selects a video signal relating to the input (recording) of a digital recorder 26 or a video signal relating to the output (playback) of the digital recorder 26, and outputs the selected video signal to an EVF 24. The latter is an electric viewfinder constituted by a CRT or liquid-crystal display.

An adder 22 adds character data to the luminance signal Y as necessary to display character information on the EVF 24. A CG (character generator) 23 supplies the character data to the adder 22.

A selector 25 is for switching between outputs from the rate converters 19, 20 and output signals from the digital color demodulator 16. The digital recorder 26 subjects the input video signal to data compression, decompression, error correction, digital modulation and digital demodulation processing. A video signal is recorded on a video tape 27 by the digital recorder 26.

A CPU 34 controls the overall operation of the image sensing recording apparatus.

The apparatus further includes an external output terminal 35 for the color signal C, an external output terminal 36 for the luminance signal Y, an oscillator 37 for generating a clock signal having a frequency of 13.5 MHz, an oscillator 38 for generating a clock signal having a frequency of 14.3 MHz, and a selector 39 for switching between the clock signals generated by the oscillators 37, 38. What is particularly noteworthy is that the 13.5 MHz clock signal generated by the oscillator 37 is applied to both the digital color modulator 6 and the digital recorder 26.

The operation of the image sensing recording apparatus will now be described in detail. The image sensing recording apparatus is capable of operating in any one of three modes, namely a camera recording mode, an external input recording mode and a playback mode, which is selected by controlling changeover of the selectors 14, 21, 25 and 39 by means of the CPU 34. Each of these operating modes will now be described.

In the camera recording mode, the CPU 34 exercises control in such a manner that the selector 14 selects the input terminals C for the signals from the camera (CCD 2), the selector 25 selects the input terminals D for the signals from the digital color demodulator 16 and the selector 21 selects the input terminals C for the signals from the selector 14. Further, the selector 39 selects the 13.5 MHz clock signal generated by the oscillator 37.

The components of the apparatus operate as follows in the camera recording mode: The optical image which impinges upon the CCD 2 via the image pick-up lens 1 is formed on the image sensing surface of the CCD 2, converted from a light signal to an electric signal and outputted to the sample-and-hold circuit 3 as an analog video signal. The latter is sampled and held by the sample-and-hold circuit 3, converted into a digital signal by the A/D converter 4 and the digital signal is subjected to processing such as filtering, gamma gain adjustment and clipping by the DSP 5, with the signal being separated into the luminance signal Y and the color-difference signals R-Y, B-Y.

The color-difference signals R-Y, B-Y enter the digital color modulator 6 where they are modulated by the 13.5 MHz clock signal supplied from the oscillator 37, namely by a clock signal whose frequency is identical with the driving frequency of the digital recorder 26. The color signal C is the result. The luminance signal Y is converted to an analog signal by the D/A converter 11 and enters the luminance-signal input terminal C of the selector 14 via the low-pass filter 13.

The color signal C outputted by the digital color converter 6 is converted to an analog signal by the D/A 25 converter 10, and the analog signal enters the color-signal input terminal C of the selector 14 via the band-pass filter 12.

In the camera recording mode, the selector 14 selects the input terminals C, as mentioned above, thereby selecting and outputting the color signal C and the luminance signal Y of the video signal (camera image) from the image sensing system that includes the CCD 2. The color signal C, which has a frequency (13.5 MHz) identical with that of the clock signal supplied to the digital recorder 26, is converted to a digital signal by the A/D converter 15, and the digital signal is converted to the digital color-difference signals R-Y, B-Y at the same frequency of 13.5 MHz by the digital color demodulator 16.

The digital color-difference signals R-Y, B-Y enter the digital recorder 26 via the input terminals D of the selector 25. The recorder 26 subjects the color-difference signals to compression, error correction, digital modulation and the like and records the results on the video tape 27.

Thus, the digital color modulator 6, which modulates the digital color-difference signals R-Y, B-Y supplied by the image sensing system, and the digital color demodulator 16 are driven by clock signals having the same frequency (13.5 MHz) as that of the digital recorder 26. As a result, when the digital color-difference signals R-Y, B-Y supplied by the image sensing system are recorded, it is unnecessary to carry out a rate conversion of the frequency and the deterioration in picture quality that accompanies a rate conversion can be avoided.

Meanwhile, the luminance signal Y is converted to a digital signal by the A/D converter 18 following processing by the low-pass filter 17, the digital signal enters the digital recorder 26, the signal is subjected to processing the same as that applied to the color signal C and the resulting signal is stored on the video tape 27.

The digital recorder 26 outputs the input video signal as is via a return pass (not shown) during the recording of the video signal. The digital color-difference signals R-Y, B-Y in the video signal outputted via this return path are converted to analog signals by the D/A converters 29, 30 and are modulated at a frequency (14.3 MHz), which is four times the normal color subcarrier, by the analog color converter 31. The modulated signal is outputted from the output terminal 35 via the band-pass filter 33. Further, the digital luminance signal Y outputted via the return path is converted to an analog signal by the D/A converter 28, and the analog signal is outputted from the output terminal 36 via the low-pass filter 32.

Further, the output signal from the selector 14 enters the EVF 24 via the selector 21 so that the video captured by the camera can be monitored. At this time the character information from the CG 2 is added to the luminance signal Y, which enters the EVF 24 from the selector 21, by the adder 22.

The external input recording mode will be described next.

In this mode, the CPU 34 exercises control in such a manner that the selector 14 selects input terminals S, to which the external video signals are applied from the input terminal 7, or input terminals L, to which composite video from the input terminal 8 is applied. It will be assumed here that the input terminals L which enter the composite video have been selected. Further, the CPU 34 performs control in such a manner that the selector 25 selects input terminals T, to which signals from the rate converters 19, 20 are applied, and the selector 21 selects the input terminals C for the signals from the selector 14. Further, the selector 39 selects the 14.3 MHz clock signal generated by the oscillator 38.

The composite video signal which has entered from the input terminal 8 is separated into the luminance signal Y and color signal C by the YC separator 9, and the luminance signal Y and color signal C are outputted via the luminance-signal and color-signal input terminals L of the selector 14. The color signal C is converted to the color digital signal by the A/D converter 15 at a frequency (14.2 MHz) four times that of the normal subcarrier frequency, and the digital color signal is demodulated to the digital color-difference signals R-Y, B-Y by the digital color demodulator 16 at the same frequency 14.3 MHz.

The digital color-difference signals R-Y, B-Y are rate-converted to 13.5 MHz, which is the same as the driving frequency of the digital recorder 26, by the respective rate converters 19, 20, these signals are then supplied to the digital recorder 26 via the input terminals of the selector 25, and the signals are recorded on the video tape 27.

Meanwhile, the luminance signal Y enters the A/D converter 18 via the low-pass filter 17 and is sampled and converted to the digital luminance signal Y by the A/D converter 18 at 13.5 MHz. The digital luminance signal Y enters the digital recorder 26 and is recorded on the video tape 27 along with the color-difference signals R-Y, B-Y.

The output video signal of the selector 14 is delivered to the selector 21 as well and is displayed by the EVF 24, whereby the input video signal from the input terminal 8 is monitored.

The playback mode will be described next.

In this mode, the selector 21 selects the input terminals R for entering the playback signals from the analog color converter 31 and D/A converter 28. Under these conditions the video signal that has been recorded on the video tape 27 is played back by the digital recorder 26, and the luminance signal Y is converted to an analog signal at 14.3 MHz by the D/A converter 28. The analog signal is outputted from the external output terminal 36 via the low-pass filter 32. Meanwhile, the color-difference signals R-Y, B-Y are converted to analog signals at 14.3 MHz by the D/A converters 29, 30, respectively, these are converted to the modulated color signal C by the analog color modulator 31, and the modulated color signal C is outputted from the external output terminal 35 via the band-pass filter 33.

Further, the color signal C from the analog color converter 31 and the luminance signal Y from the D/A converter 28 enter the EVF 24 via the selector 21, whereby the video that has been recorded on the video tape 27 is monitored.

Thus, in accordance with the image sensing recording apparatus of this embodiment as described in detail above, a clock signal whose frequency is the same as that of digital recording means is supplied to digital modulating means, whereby a digitally modulated video signal (color signal) can be recorded without performing a rate conversion of frequency. This makes it possible to prevent the occurrence of beat-related problems caused by a rate conversion and to avoid a decline in picture quality.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image sensing recording apparatus comprising:
    digital modulating means for modulating a digital chrominance signal using a first clock signal Ion the basis of which modulation is performed by said digital modulating means and;
    D/A conversion means for converting an output signal of said digital modulating means into an analog modulated chrominance signal;
    switching means for selectively supplying either one of said analog modulated chrominance signal and an external analog modulated chrominance signal;
    A/D conversion means for converting an output signal of said switching means into a digital modulated chrominance signal;
    demodulating means for demodulating said digital modulated chrominance signal; and
    digital recording means for digitally recording an output signal of said demodulation means using a second clock signal,
    wherein said first and second clock signals are identical in frequency.

2. The apparatus according to claim 1, wherein the digital chrominance signal is produced on the basis of an image pick-up signal produced by an image sensing element.

3. The apparatus according to claim 1, wherein the first and second clock signals have a frequency of 13.5 Mhz.

4. The apparatus according to claim 1, wherein the digital chrominance signal includes R-Y and B-Y color-difference signals, and said digital modulating means produces a color signal from the color-difference signals.

5. The apparatus according to claim 2, wherein the first and second clock signals have a frequency of 13.5 Mhz.

6. An image sensing recording apparatus comprising:
    digital modulating means for modulating a digital chrominance signal using a first clock signal;
    D/A conversion means for converting an output signal of said digital modulating means into an analog modulated chrominance signal;
    switching means for selectively supplying either one of said analog modulated chrominance signal and an external analog modulated chrominance signal;
    A/D conversion means for converting an output signal of said switching means into a digital modulated chrominance signal;

demodulating means for demodulating said digital modulated chrominance signal using a second clock signal the frequency of which is identical with that of said first clock signal.

7. The apparatus according to claim 6 further comprising:

recording means for recording a chrominance signal demodulated by said demodulating means, on a recording medium on the basis of a third clock signal having a frequency identical with that of the second clock signal.

8. The apparatus according to claim 7, wherein the recording medium is a video tape.

9. The apparatus according to claim 7, wherein the first, second and third clock signals have a frequency of 13.5 MHz.

10. An image sensing recording method comprising:

a digital modulating step of modulating a digital chrominance signal using a first clock signal;

a D/A conversion step of converting an output signal generated in said digital modulating step into an analog modulated chrominance signal;

a switching step of selectively supplying either one of said analog modulated chrominance signal and an external analog modulated chrominance signal;

an A/D conversion step of converting an output signal generated in said switching step into a digital modulated chrominance signal;

a demodulating step of demodulating said digital modulated chrominance signal; and a digital recording step of digitally recording an output signal generated in said demodulation step using a second clock signal the frequency of which is identical with that of said first clock signal.

11. The method according to claim 10, wherein the digital chrominance signal is produced on the basis of an image pick-up signal by an image sensing element.

12. The method according to claim 8, wherein the first and second clock signals have a frequency of 13.5 MHz.

13. The method according to claim 10, wherein the first and second clock signals have a frequency of 13.5 MHz.

14. The method according to claim 10, wherein the digital chrominance signal includes R-Y and B-Y color-difference signals, and a color signal is produced from the color-difference signals at said digital modulating step.

15. An image sensing recording method comprising:

a digital modulating step of modulating a digital chrominance signal using a first clock signal;

a D/A conversion step of converting a signal modulated in said digital modulating step into an analog modulated chrominance signal;

a switching step of selectively supplying either one of said analog modulated chrominance signal and an external analog modulated chrominance signal;

an A/D conversion step of converting an output signal generated in said switching step into a digital modulated chrominance signal; and a demodulating step of demodulating the digital modulated chrominance signal generated in said A/D modulating step on the basis of a second clock signal the frequency of which is identical with that of said first clock signal.

16. The method according to claim 15 further comprising:

a recording step of recording a chrominance signal demodulated in said demodulating step, on a recording medium on the basis of a third clock signal having a frequency identical with that of the second clock signal.

17. The method according to claim 16, wherein the recording medium is a video tape.

18. The method according to claim 14, wherein the first, second and third clock signals have a frequency of 13.5 MHz.

* * * * *

UNITED STATES PATENT AND TRADEMARK OFFICE
CERTIFICATE OF CORRECTION

PATENT NO. : 5,699,469
DATED : December 16, 1997
INVENTOR(S) : Makoto Shimokoriyama et al.

It is certified that error appears in the above-identified patent and that said Letters Patent is hereby corrected as shown below:

Column 4, line 21, delete "25".

Column 6, lines 25-27, delete "Ion the basis of which modulation is performed by said digital modulating means and".

Column 8, line 1, change "claim 8" to --claim 11--.

Column 8, line 33, change "claim 14" to -- claim 16 --.

Signed and Sealed this

Thirteenth Day of October 1998

BRUCE LEHMAN

Attest:

Attesting Officer

Commissioner of Patents and Trademarks